(12) United States Patent
Korovin et al.

(10) Patent No.: US 11,387,537 B2
(45) Date of Patent: Jul. 12, 2022

(54) PARALLEL COIL PATHS FOR DOWNHOLE ANTENNAS

(71) Applicant: HALLIBURTON ENERGY SERVICES, INC., Houston, TX (US)

(72) Inventors: Alexei Korovin, Houston, TX (US); Anand Prakash, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/968,082

(22) PCT Filed: Jun. 14, 2018

(86) PCT No.: PCT/US2018/037601
§ 371 (c)(1),
(2) Date: Aug. 6, 2020

(87) PCT Pub. No.: WO2019/168555
PCT Pub. Date: Sep. 6, 2019

(65) Prior Publication Data
US 2021/0028530 A1 Jan. 28, 2021

Related U.S. Application Data

(60) Provisional application No. 62/637,554, filed on Mar. 2, 2018.

(51) Int. Cl.
*H01Q 1/04* (2006.01)
*E21B 49/00* (2006.01)
(Continued)

(52) U.S. Cl.
CPC ............... *H01Q 1/04* (2013.01); *E21B 49/00* (2013.01); *G01V 3/28* (2013.01); *H01Q 7/00* (2013.01); *E21B 47/13* (2020.05)

(58) Field of Classification Search
None
See application file for complete search history.

(56) References Cited

U.S. PATENT DOCUMENTS

| 7,915,990 B2 | 3/2011 | Stelzer et al. | |
| 8,207,738 B2 * | 6/2012 | Wang | G01V 3/28 |
| | | | 324/333 |

(Continued)

FOREIGN PATENT DOCUMENTS

WO WO-2017069744 A1 4/2017

OTHER PUBLICATIONS

Korean Intellectual Property Office, International Search Report and Written Opinion, dated Dec. 7, 2018, 16 pages, Korea.

*Primary Examiner* — Douglas X Rodriguez
(74) *Attorney, Agent, or Firm* — Haynes and Boone, LLP (57) ABSTRACT

A tool that uses antennas to evaluate an environment surrounding a borehole, the tool including an antenna assembly, and the antenna assembly including a body with a longitudinal central axis, and an antenna mounted on the body in a continuous groove comprising a plurality of circumferential portions and a plurality of transition portions, with each of the circumferential portions being formed in a plane and each of the planes being spaced apart from each other and parallel to each other; and with each of the circumferential portions at least partially extending circumferentially around the body within its respective plane and each of the transition portions transitioning the groove from an end of one of the circumferential portions to an end of an adjacent one of the circumferential portions.

20 Claims, 8 Drawing Sheets

(51) Int. Cl.
  *G01V 3/28* (2006.01)
  *H01Q 7/00* (2006.01)
  *E21B 47/13* (2012.01)

(56) References Cited

U.S. PATENT DOCUMENTS

2009/0302847 A1   12/2009  Knizhnik
2014/0159731 A1    6/2014  Davies et al.
2016/0072184 A1    3/2016  Gao et al.
2017/0191364 A1*  7/2017  Wang .................... E21B 47/017

\* cited by examiner

FIG.8

PARALLEL COIL PATHS FOR DOWNHOLE ANTENNAS

CROSS-REFERENCE TO RELATED APPLICATIONS

The present application is a U.S. national stage patent application of International Patent Application No. PCT/US2018/037601, filed on Jun. 14, 2018, which claims the benefit of priority of U.S. Provisional Application Ser. No. 62/637,554 filed on Mar. 2, 2020. The entire disclosure of each of these applications is incorporated herein by this reference.

TECHNICAL FIELD

The present disclosure generally relates to oilfield equipment and, in particular, to downhole tools, drilling and related systems and techniques for forming an antenna in a downhole tool. More particularly still, the present disclosure relates to methods and systems for forming grooves in an antenna assembly in which conductors (e.g. wires) are installed to form an antenna portion that receives and/or transmits signals between an environment surrounding the tool, such as an earthen formation.

BACKGROUND

In order to produce formation fluids from an earthen formation, boreholes can be drilled into the earthen formation to a desired depth for producing the formation fluids. During and/or after drilling a borehole, various antennas can be deployed into the borehole in a drill string assembly and/or a wireline logging tool to measure various borehole parameters (e.g. formation resistivity, formation permeability, ranging distance and direction, tubing string integrity, cement sheath integrity, etc.). Antennas can be used as transmitters to inject energy (e.g. electromagnetic, electrical, electromechanical, magnetic flux, etc.) into an earthen formation surrounding a borehole. Antennas can also be used as receivers to receive energy from the earthen formation.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Generally, an antenna assembly for an electromagnetic resistivity logging tool is provided. The antenna assembly can include a tool body and be configured to transmit and/or receive electromagnetic (EM) waves. The antenna assembly includes an antenna formed of a wire that is wrapped around the tool body to form a coil with an input and an output for connection to signal transmission to or from the coil. Circuitry can be coupled to the coil for generating signal to be transmitted by the coil or for receiving signal from the coil. The tool that can include a body (or housing), and a continuous groove in an exterior surface of the body. The continuous groove can include multiple circumferential portions, with each circumferential portion disposed within a plane and each plane being parallel to adjacent planes; and multiple intermediate transition portions, with each of the intermediate transition portions coupling an end of one circumferential portion to an end of an adjacent circumferential portion.

Figure 1:
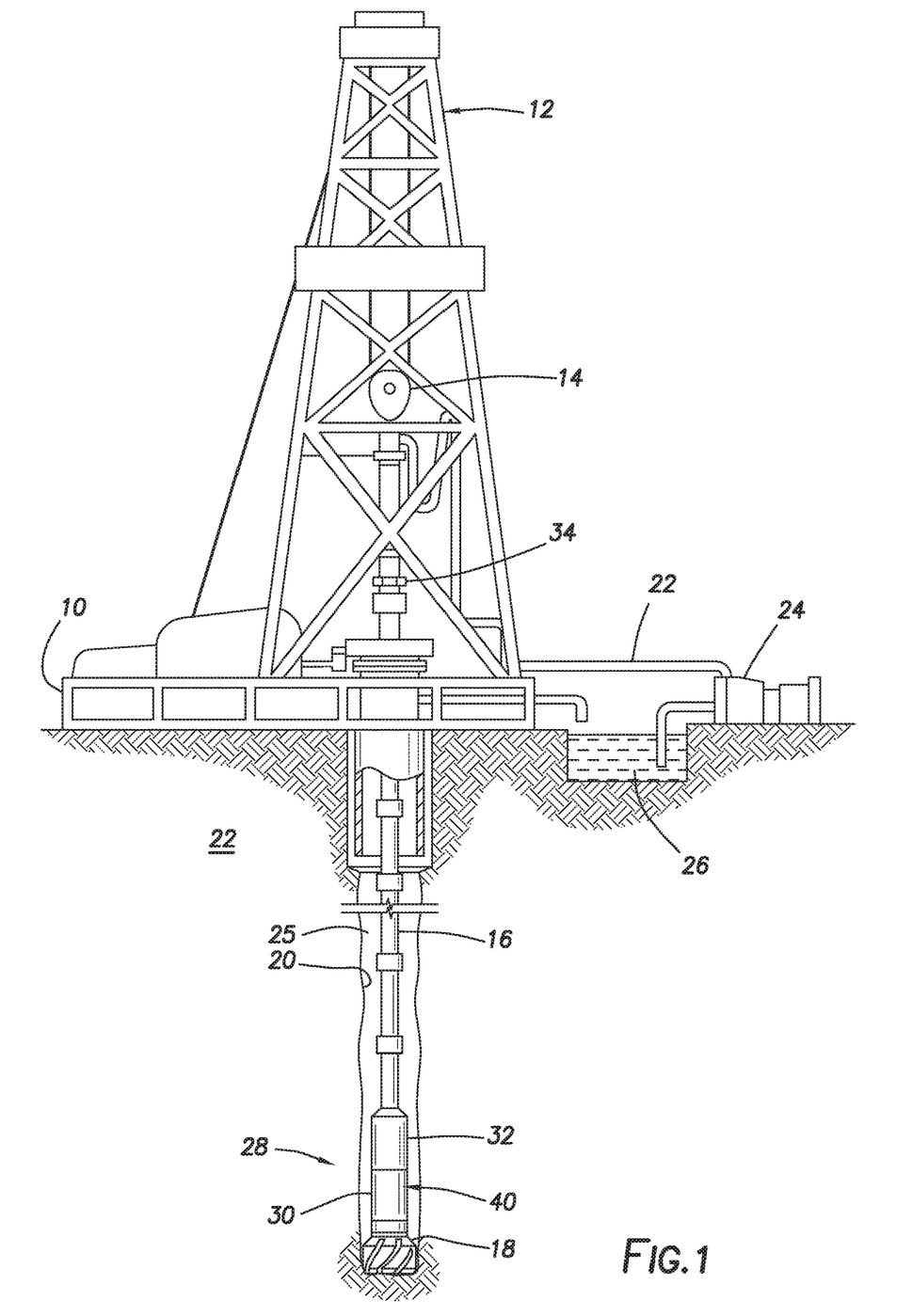
FIG. 1 is a representative partial cross-sectional view of a system for capturing subsurface measurement data in a logging while drilling (LWD) operation with an antenna, according to one or more example embodiments.

The disclosed tool configurations and operations are best understood in the context of the larger systems in which they operate. Accordingly, an illustrative measurement while drilling (MWD) and/or logging while drilling (LWD) environment is shown in FIG. 1. A drilling platform 10 supports a derrick 12 having a traveling block 14 for raising and lowering pipe strings such as drill string 16. A drill bit 18 carried on drill string 16 may be driven by a downhole motor and/or rotation of the drill string 16. As drill bit 18 rotates, it creates a borehole 20 in formation 22. A pump 24 circulates drilling fluid downhole through the interior of drill string 16, through orifices in drill bit 18, back to the surface via the annulus 25 formed between borehole 20 and drill string 16, and into a retention tank 26. The drilling fluid transports cuttings from the borehole 20 into the tank 26 and aids in maintaining the borehole integrity.

An electromagnetic resistivity logging tool 30 can be carried by drill string 16. In some embodiments, resistivity tool 30 is integrated into the bottom-hole assembly 28, near drill bit 18. As the drill bit 18 extends the borehole 20 through the formation 22, resistivity logging tool 30 may be activated to collect measurements relating to various formation properties, as well as the orientation and position of the tool and various other drilling conditions. The resistivity logging tool 30 may radiate the formation with electromagnetic signals and/or collect electromagnetic signals from the formation. The resistivity logging tool 30 may take the form of a drill collar, i.e., a thick-walled tubular that provides weight and rigidity to aid the drilling process. A telemetry sub 32 may be included to transfer tool measurements to a surface receiver 34 and to receive commands from the surface receiver.

Figure 2:
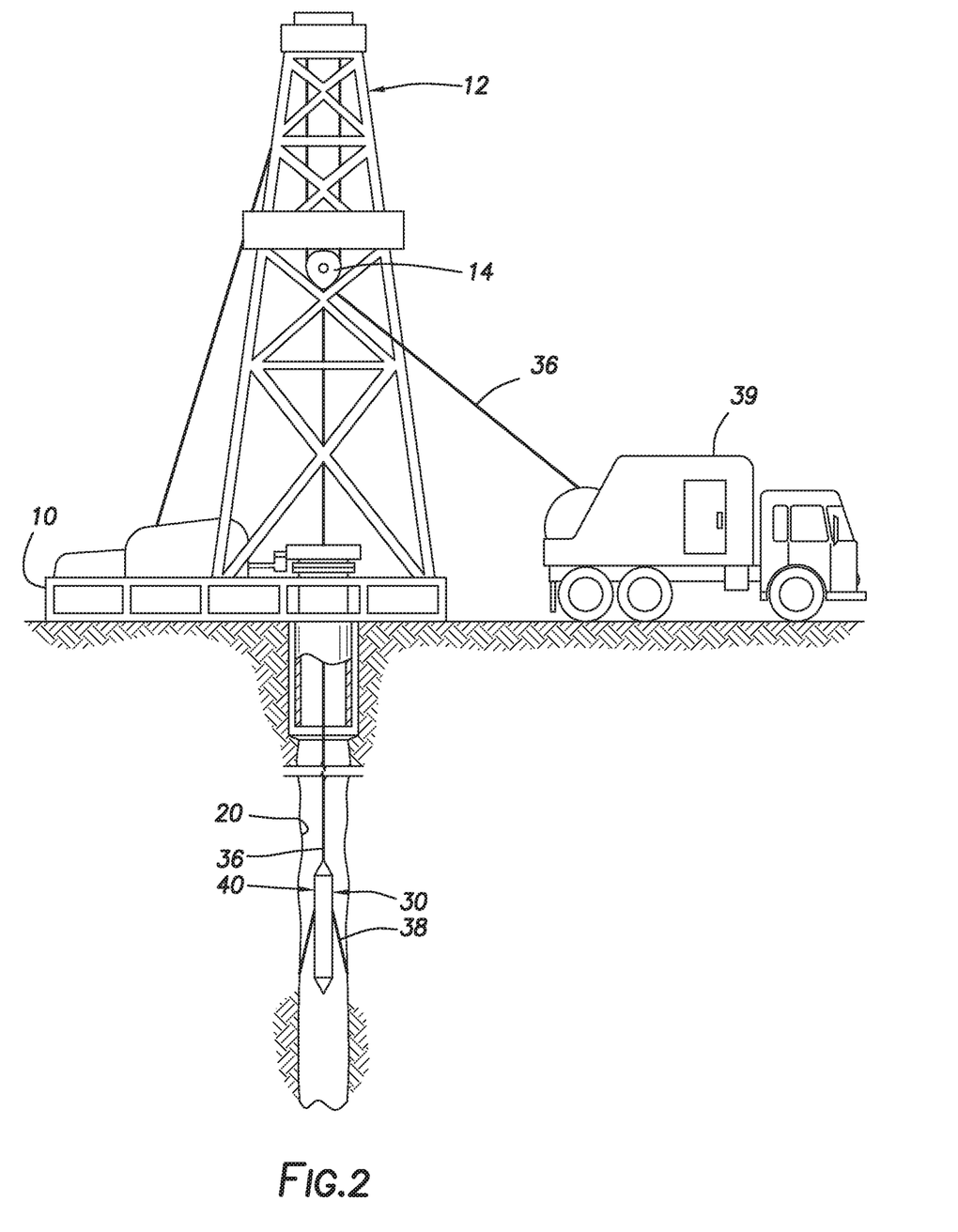
FIG. 2 is a representative partial cross-sectional view of a system for capturing subsurface measurement data in a wireline logging operation with an antenna, according to one or more example embodiments.

As shown in FIG. 2, rather than deploying resistivity logging tool 30 on a drill string for use in LWD and/or MWD operations, resistivity logging tool 30 may be deployed into borehole 20 on another conveyance mechanism 36, such as a wireline, slickline, cable, coiled tubing or other tubing string. Thus, in FIG. 2, a cable 36 is utilized to lower resistivity logging tool 30 into borehole 20. Cable 36 may include conductors for transporting power to resistivity logging tool 30 and telemetry from resistivity logging tool 30 to the surface. Resistivity logging tool 30 may have centralizing arms 38 that center the tool 30 within the borehole 20 as the tool is pulled uphole. A logging facility 39 collects measurements from resistivity logging tool 30, and may include computing facilities for processing and storing the measurements gathered by the logging tool 30. The logging tool 30 can include one or more antenna assemblies 40 used to transmit and/or receive electromagnetic signals between the formation and the downhole tool 30.

Figure 3:
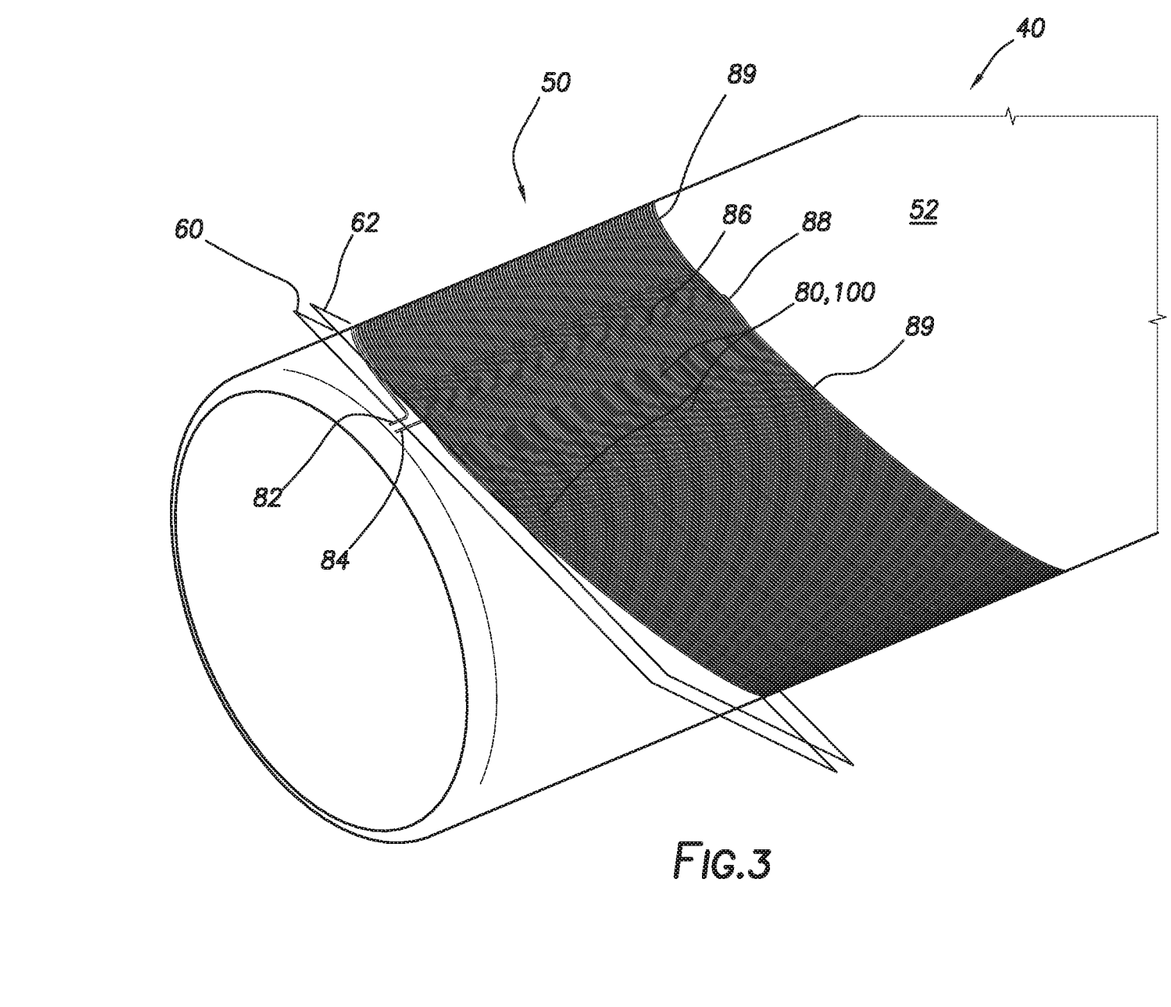
FIG. 3 is representative perspective view of an antenna assembly of a downhole tool that can benefit from the principles of this disclosure, according to one or more embodiments.

FIG. 3 shows a representative perspective view of an example antenna assembly 40 with a body 52 having an antenna 50 formed on an exterior surface of the body 52. A continuous groove 80 is formed in an exterior surface of the body 52. The continuous groove 80 comprises several portions and each portion can contribute to a signal path when a continuous conductor 100 is installed in the continuous groove 80. The groove 80 begins at an inlet transition portion 84, extends axially along a groove portion 86 that extends to an intermediate transition portion 88. The groove further extends from the intermediate transition portion 88 to a circumferential portion 89 that extends circumferentially around the body 52 to a second transition portion 88, which transitions from one circumferential portion 89 to a second circumferential portion 89. This continues until the last circumferential portion 89 of the continuous groove 80 extends to a last intermediate transition portion 88 that extends to an outlet transition portion 82.

The intermediate transition portions 88 may extend across the groove portion 86, which can be recessed into the body 52 deeper than the intermediate transition portions 88. The portion of each intermediate transition portion 88 that is positioned above the groove portion 86 is still a portion of the continuous groove 80, even though the intermediate transition portions 88 have a bottom of the groove that is shallower than the bottom of the groove portion 86. Therefore, the continuous groove 80 is still seen as being continuous even when the bottom of the continuous groove is deeper in some locations along the continuous groove. The continuous groove is seen to be continuous when the continuous conductor can be installed in the continuous groove from the inlet transition portion 84 to the outlet transition portion 82. As used herein, the "continuous conductor" refers to a conductor that is electrically conductive from one end to the other. Therefore, the continuous conductor can include a conductor made up of various different segments, but when the segments are coupled together to form the continuous conductor, the continuous conductor is electrically conductive from one end to the other.

When a conductor 100 is installed in the groove 80, the installation of the conductor 100 can begin by laying the conductor 100 in the inlet transition portion 84, then installing the conductor 100 along the axially extending groove portion 86, then installing the conductor 100 around the bend in the groove 80 to the first intermediate transition portion 88, then installing the conductor 100 in the first circumferential portion 89 around the body 52 to the second intermediate transition portion 88 of the groove 80, then installing the conductor 100 in the second intermediate transition portion 88, which transitions the conductor 100 to a second circumferential portion 89. The conductor 100 installation continues in the circumferential portions 89 and intermediate transition portions 88 until the conductor 100 is installed in the last intermediate transition portion 88, then around a bend in the groove 80 to the outlet transition portion 82. The ends of the conductor 100 at the inlet transition portion 84 and the outlet transition portion 82 are coupled (e.g. connected) to signal generation/reception circuitry (not shown) of the antenna assembly.

As described above, the continuous groove 80 comprises a plurality of circumferential portions 89 and intermediate transition portions 88. Each circumferential portion 89 extends at least partially around an exterior surface of the body 52. Each circumferential portion 89 is positioned in a single plane with each plane of each circumferential portion 89 being parallel to each other. For example, one circumferential portion 89 near the end of the continuous groove 80 is formed in a plane 62, with another circumferential portion 89 being formed in a plane 60. These planes 60, 62 are parallel to each other, and the circumferential portion 89 within each plane is in line and parallel with its respective plane. The intermediate transition portions 88 are formed to couple an end of one circumferential portion 89 to an adjacent circumferential portion 89, allowing the continuous groove 80 to consist of circumferential portions 89 formed in parallel planes with respect to each other, and intermediate transition portions 88 that transition the continuous groove 80 from one adjacent parallel plane (e.g. 62) to another adjacent plane (e.g. 60). As used herein, "planes" refer to planes of the continuous groove 80 or the continuous conductor 100, and "adjacent planes" refer to planes of the continuous groove 80 or the continuous conductor 100 that are spaced apart from each other without another plane of the continuous groove 80 or the continuous conductor 100 disposed between them.

Figure 4:
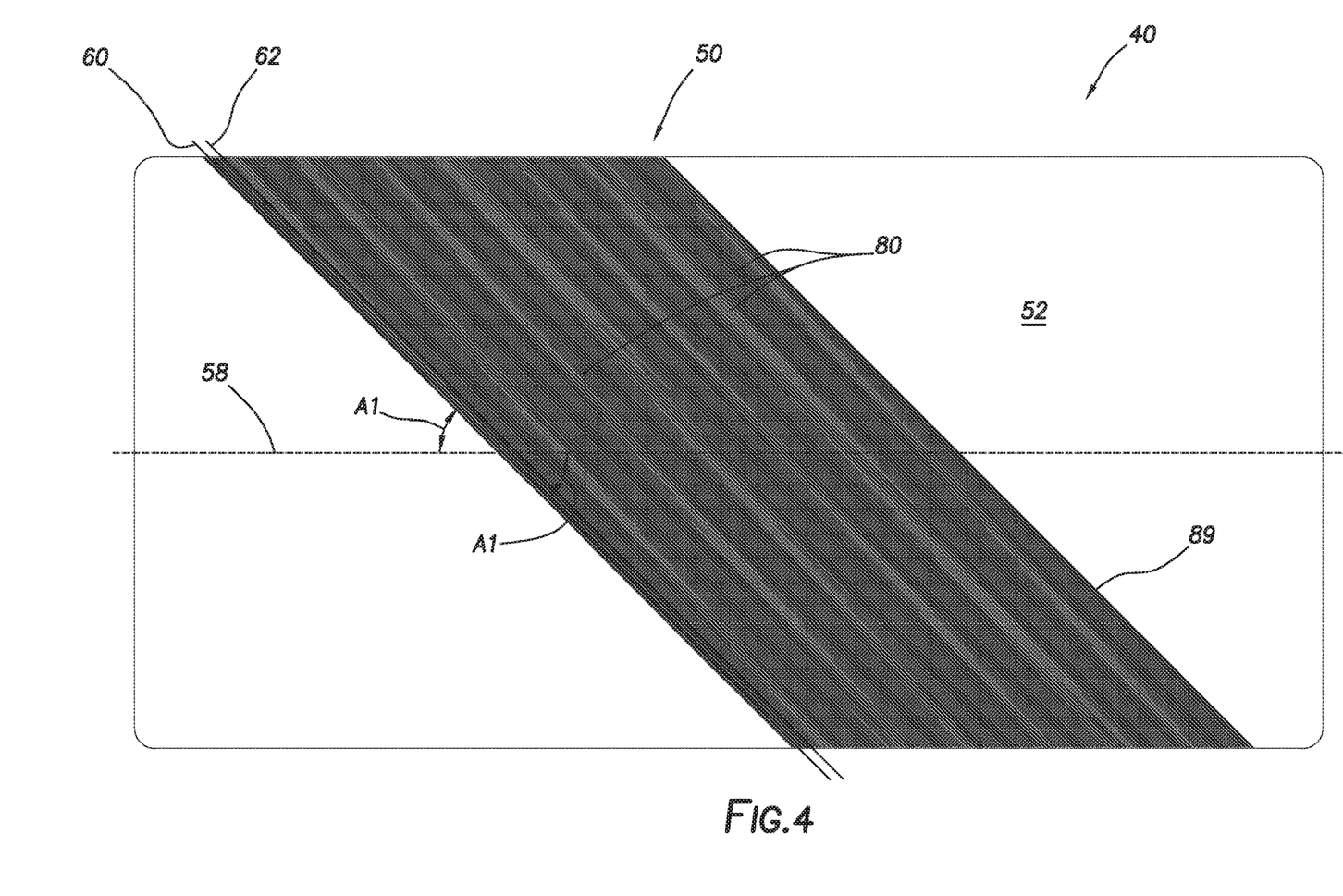
FIG. 4 is a representative side view of the antenna assembly of FIG. 3, according to one or more embodiments.

FIG. 4 shows a representative side view of an example antenna assembly 40 with a body 52 having an antenna 50 formed on an exterior surface of the body 52. The continuous groove 80 is formed in an exterior surface of the body 52. As can be seen, planes 60, 62 are parallel to each other. It should be understood, that planes 60 and 62 are shown separated to illustrate the parallel relationship between all planes in which the circumferential portions 89 are formed. If no other planes of the continuous groove 80 are positioned between planes 60 and 62, then these planes can be referred to as adjacent planes. The antenna assembly 40 may have a central axis 58 which extends longitudinally through the antenna assembly 40. It should be understood that the central axis 58 of the antenna assembly 40 can be offset from a central axis of the downhole tool 30. Each plane (e.g. 60, 62) can be angled from the axis 58 by an angle A1. As can be seen, both planes 60 and 62 are angled with respect to the axis 58 by the angle A1. The angle A1 can range from greater than "zero" degrees to less than 180 degrees. For example, the angle A1, can be 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, and 170 degrees, as well as angles 41, 42, 43, 44, 46, 47, 48, 49, 131, 132, 133, 134, 136, 137, 138, and 139 degrees.

Figure 5:
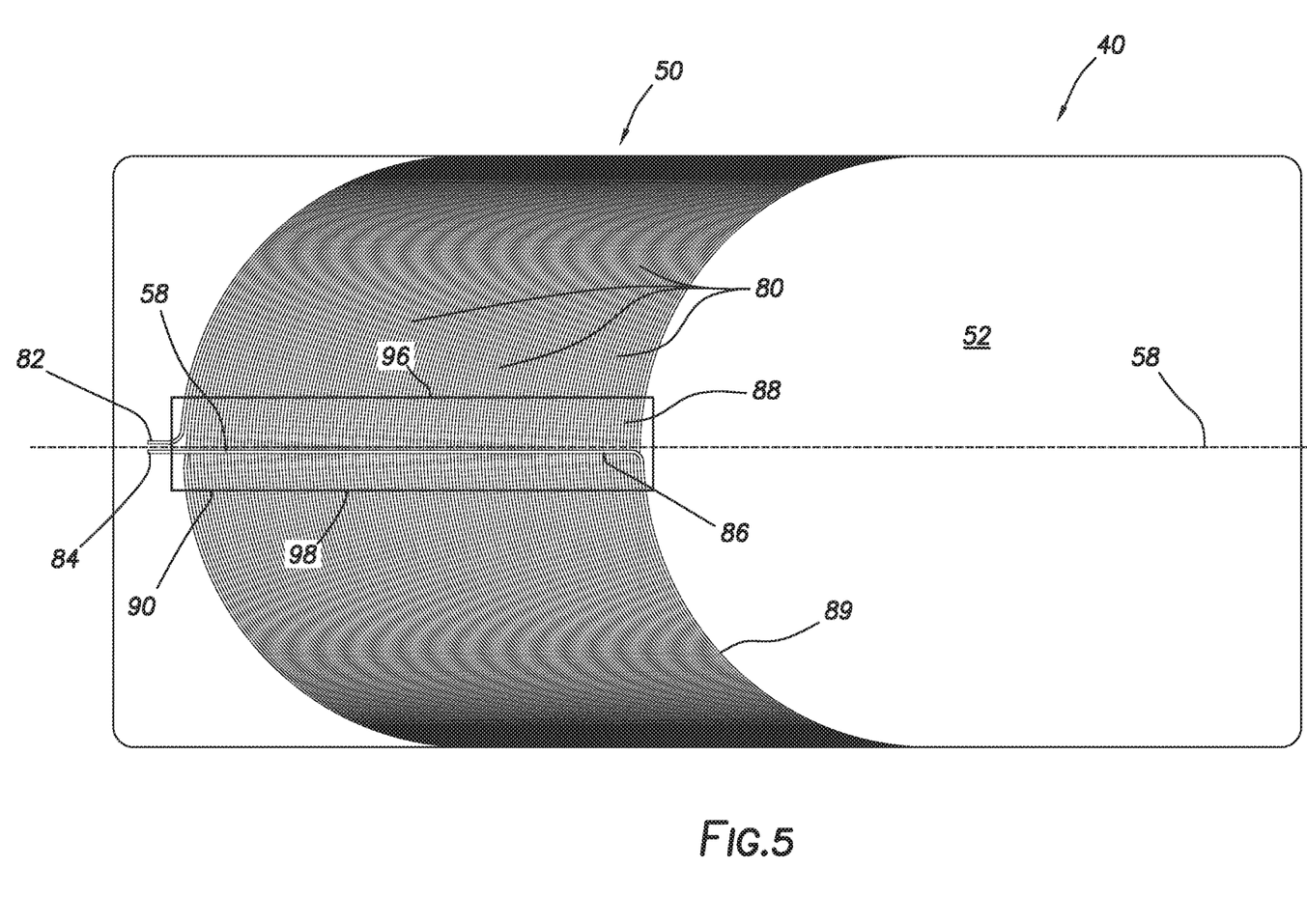
FIG. 5 is a representative top view of the antenna assembly of FIG. 3, according to one or more embodiments.

FIG. 5 shows a representative top view of an example antenna assembly 40 with a body 52 having an antenna 50 formed on an exterior surface of the body 52. The continuous groove 80 can be formed on the exterior surface of the body 52 as described above regarding FIG. 3. The circumferential portions 89 are formed in individual parallel planes (e.g. 60, 62) and extend circumferentially around the body 52 from one side 98 of a transition zone 90 to an opposite side 96 of the transition zone 90. The intermediate transition portions 88 transition the circumferential portion 89 in one plane to a circumferential portion 89 in an adjacent plane, such that when a wire is installed in the continuous groove 80, the wire runs from an end of one circumferential portion 89 at a side 96 of the transition zone 90 to a beginning of another circumferential portion 89 at a side 98 of the transition zone 90.

Figure 6:
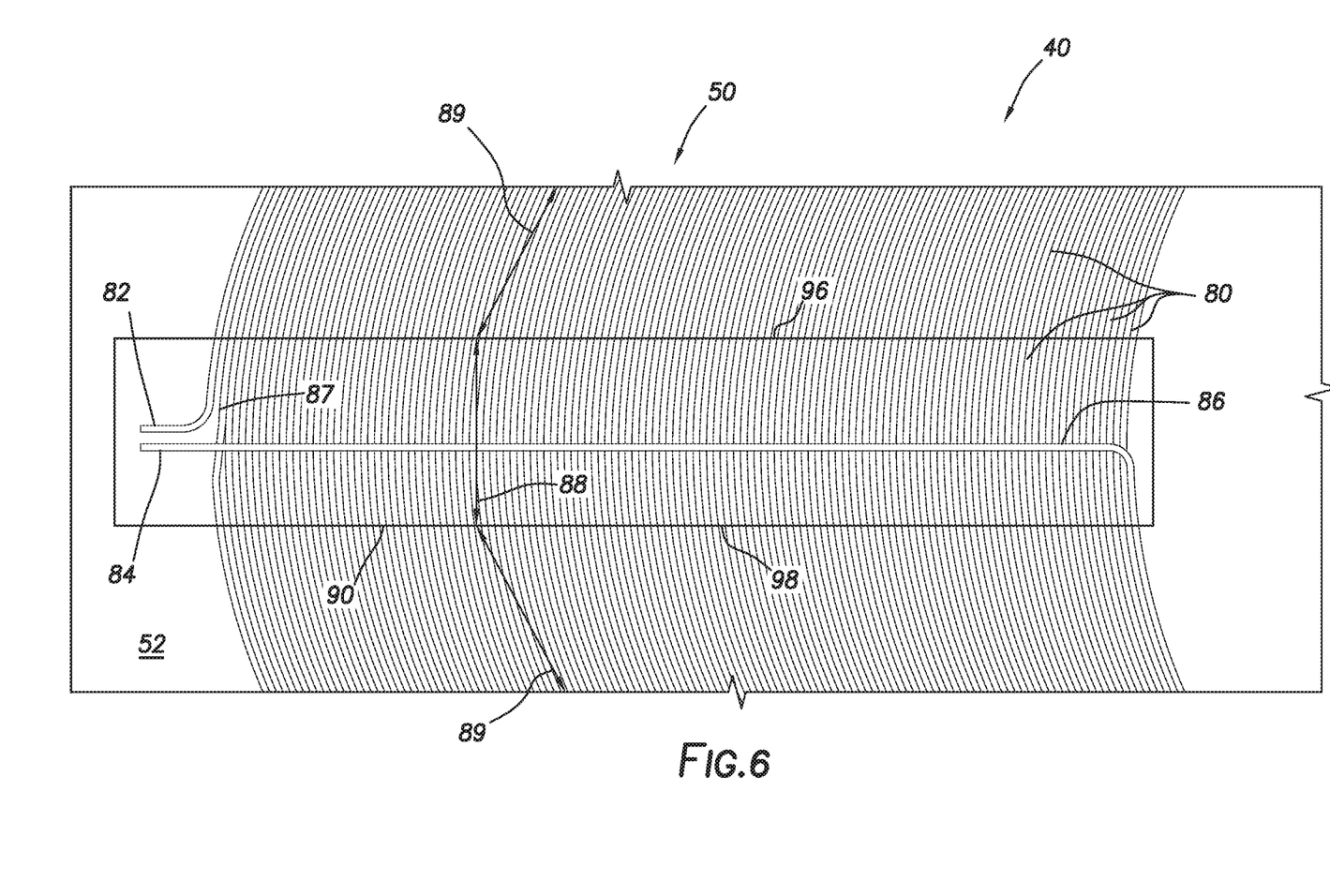
FIG. 6 is another representative top view of the antenna assembly of FIG. 3, according to one or more embodiments.

FIG. 6 shows a more detailed representative top view of an example antenna assembly 40 with a body 52 having an antenna 50 formed on an exterior surface of the body 52. The transition zone 90 is defined as being the area within the box shown. One side 96 of the transition zone 90 is where an end of the circumferential portions 89 couple to intermediate transition portions 88, which transition the continuous groove 80 from the end of one circumferential portion 89 to a beginning of an adjacent circumferential portion 89. The circumferential portions 89 can extend circumferentially between 5% to 95% of the total circumference of the exterior surface of the body 52, while the transition zone can be respectively 95% to 5% of the total circumference of the exterior surface of the body 52. The circumferential portions 89 can extend circumferentially 5%, 10%, 15%, 20%, 25%, 30%, 35%, 40%, 45%, 50% on up to 75%, 80%, 85%, 90%, and 95% of the total circumference of the exterior surface of the body 5, with the transition zone 90 circumferentially extending a complimentary amount around the exterior surface of the body 52 ranging from 95% to 5%.

It can be seen in FIG. 6 that the exterior surface of the body 52 may have a longitudinally extending recess or valley that recesses below the circumference of the body 52 to provide protection a wire installed in the inlet and outlet transition portions 82, 84, the intermediate transition portions 88, and the axially extending portion 86. The axially extending portion 86 is further recessed into the body 52 such that a wire installed in the axially extending portion 86 runs beneath wire portions installed in the intermediate transition portions 88. One intermediate transition portion 88 (i.e. intermediate transition portion 87) more clearly illustrates both the transition path from one circumferential portion 89 to an adjacent circumferential portion 89 and the recess or valley in the surface of the body 52 that is recessed radially inward.

Figure 7:
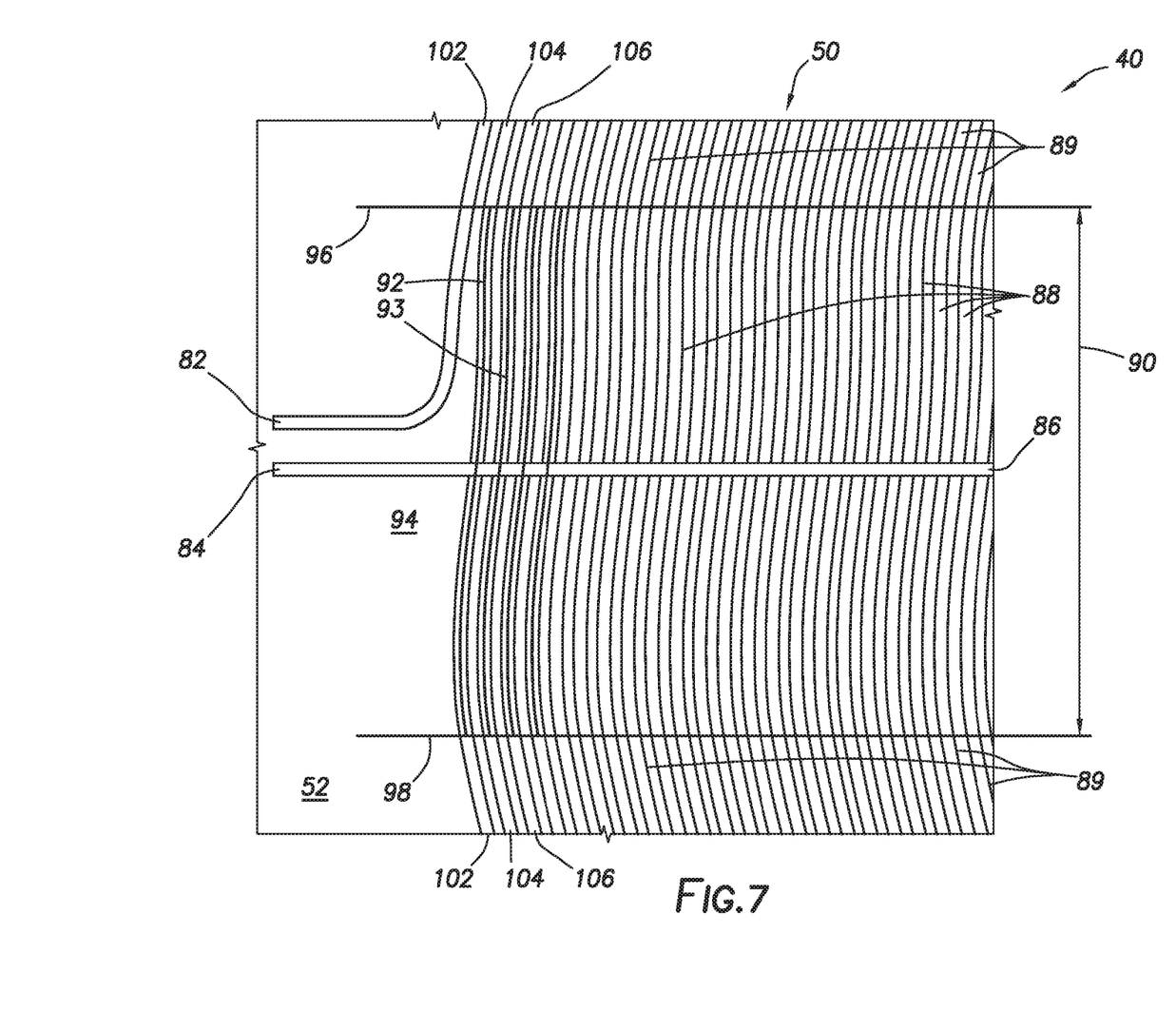
FIG. 7 is another representative top view of the antenna assembly of FIG. 3, according to one or more embodiments.

FIG. 7 shows a more detailed representative top view of an example antenna assembly 40 having an antenna 50 formed on an exterior surface of the body 52. The transition zone 90 includes the longitudinal recess (or valley) 94 that radially inwardly recesses wires that are installed in the intermediate transition portions 88, which extend from one side 96 of the transition zone 90 to the opposite side 98 of the transition zone 90. FIG. 7 illustrates how the circumferential portions 89 (e.g. portions 102, 104, 106) combined with the intermediate transition portions 88 support forming a continuous groove 80, such that a continuous wire can be installed in the groove 80 to form a coil structure of the antenna 50. Ends of the circumferential portions 102, 104, and 106 are shown with one end of each portion 102, 104, and 106 at the side 96 of the transition zone 90 and the other end of each portion 102, 104, and 106 at the opposite side 98 of the transition zone 90. Each portion 102, 104, and 106 is formed in individual planes that are parallel to each other. Therefore, to make a continuous groove, the intermediate transition portions 88 transition the groove 80 from one portion 102, 104, or 106 to an adjacent portion 102, 104, or 106. In this embodiment, one of the intermediate transition portions 88 (i.e. intermediate transition portion 93) extends the groove 80 from an end of the portion 106 at side 96 to an end of the portion 104 at side 98. The groove 80 continues along portion 104 around the body 52 to the opposite end of portion 104 at side 96 of the transition zone 90. Another one of the intermediate transition portions 88 (i.e. intermediate transition portion 92) extends the groove 80 from the end of the portion 104 at side 96 to an end of the portion 102 at side 98. The groove 80 continues along portion 102 around the body 52 to the opposite end of portion 102 at side 96 of the transition zone 90. A partial intermediate transition portion 88 extends the groove 80 from the end of portion 102 at side 96 to the outlet transition portion 82.

Figure 8:
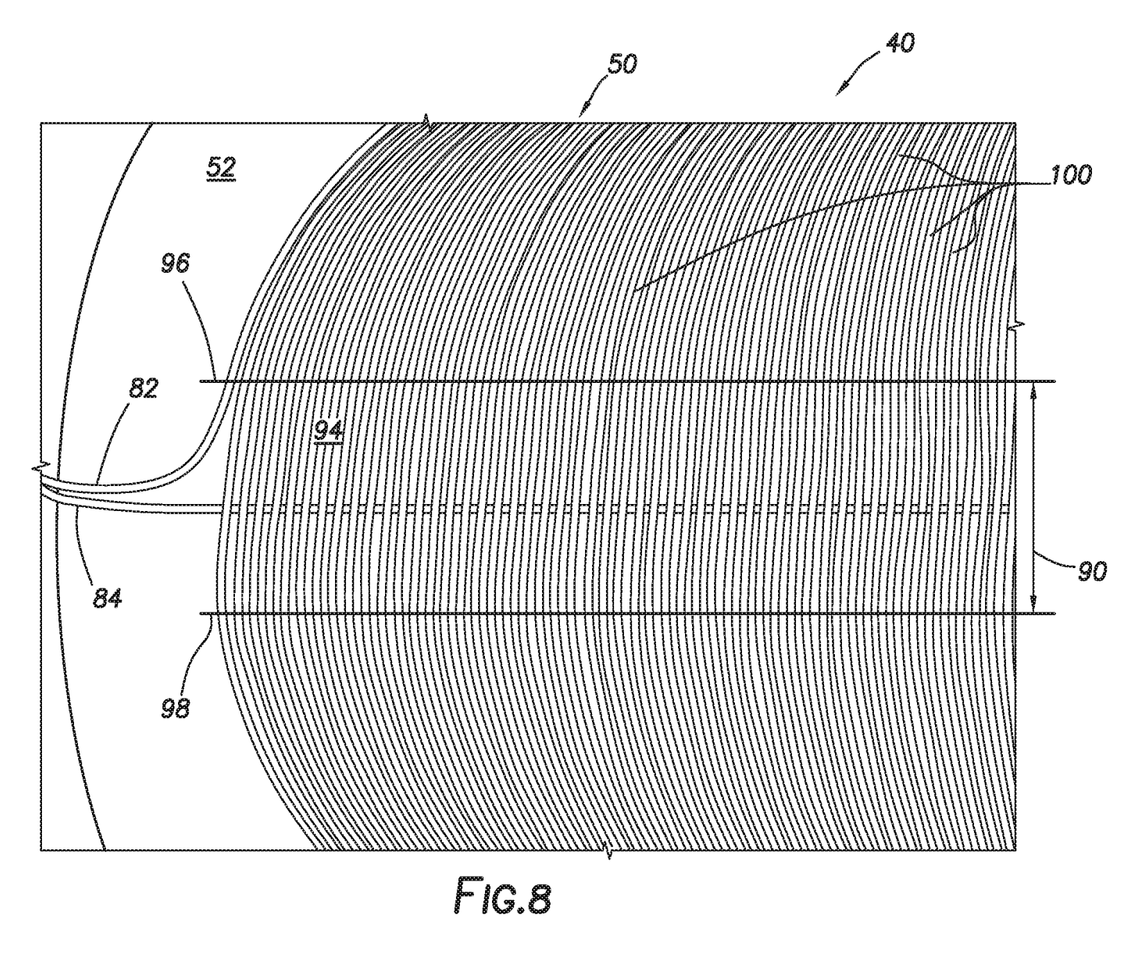
FIG. 8 is another representative top view of the antenna assembly of FIG. 3 with a conductor installed in a continuous groove according to one or more embodiments.

FIG. 8 shows a more detailed representative top view of an example antenna assembly 40 with a body 52 having an antenna 50 formed on an exterior surface of the body 52. The transition zone 90 includes the longitudinal recess (or valley) 94 that radially inwardly recesses at least a portion of the wires that are installed in the intermediate transition portions 88, which extend from one side 96 of the transition zone 90 to the opposite side 98 across the transition zone 90. FIG. 8 illustrates how the conductor 100 can be installed in the circumferential portions 89 and the intermediate transition portions 88 forming a continuous conductive path from the inlet transition portion 84 to the outlet transition portion 82.

One general aspect includes a downhole tool for evaluating an environment surrounding a borehole, the tool including an antenna assembly, and the antenna assembly including: a body with a longitudinal central axis; and an antenna mounted on the body in a continuous groove including a plurality of circumferential portions and a plurality of intermediate transition portions, with each of the circumferential portions having a first end and a second end, the entire length of the portions being between the first and second ends and being formed in a plane and each of the planes being spaced apart from each other and parallel to each other; and with each of the circumferential portions at least partially extending circumferentially around the body within its respective plane and each of the intermediate transition portions transitioning the groove from the first end of one of the circumferential portions to the second end of an adjacent one of the circumferential portions.

Implementations may include one or more of the following features. The tool where the continuous groove further includes: an inlet, and an outlet, where the continuous groove extends from the inlet to the outlet, as well as through the plurality of the circumferential portions and the plurality of the intermediate transition portions. The tool where a conductor is installed in the continuous groove forming the antenna with the conductor being continuous from the inlet to the outlet. The tool where the conductor receives and/or transmits electromagnetic signals into a formation surrounding the borehole. The tool where each of the planes are angled relative to the central axis. The tool where each of the planes are angled relative to the central axis by an angle in a range of 10 degrees to 90 degrees. The tool where the groove is recessed into an exterior surface of the body. The tool where the plurality of intermediate transition portions are disposed in a transition zone of an exterior surface of the body, and where the transition zone extends from the first end to the second end of each of the circumferential portions. The tool where the transition zone includes a longitudinal recess that is recessed radially inwardly from a circumference of the body.

One general aspect includes an antenna assembly according to principles of this disclosure.

One general aspect includes a method of manufacturing an antenna assembly according to principles of this disclosure.

One general aspect includes a downhole tool that can include a body (or housing), and a continuous groove in an exterior surface of the body. The continuous groove can include multiple circumferential portions, with each circumferential portion having a first end and a second end, the entire length of the portions being between the first and second ends and disposed within a plane, with each plane being parallel to one or more adjacent planes; and multiple intermediate transition portions, with each of the intermediate transition portions coupling the first end of one circumferential portion to the second end of an adjacent circumferential portion.

Implementations may include one or more of the following features. The body can be cylindrically shaped with a central longitudinal axis, and the intermediate transition portions can be grouped together in a transition zone of the exterior surface in the body. Each of the planes can be angled relative to the central axis by an angle in a range of 10 degrees to 90 degrees. The transition zone can be radially inwardly recessed relative to a portion of the exterior surface of the body (or housing) that is outside of the transition zone. The intermediate transition portions can begin to recess radially inward at each side of the transition zone with a deepest radially inward portion of the radial recess at a center of the transition zone. The transition zone can be in a range from 5% to 95% of a circumference of the body, or the transition zone can be in a range from 3% to 20% of a circumference of the body. The continuous groove can further include an inlet transition portion, and an outlet transition portion. A conductor can be installed in the continuous groove thereby forming an antenna with the conductor being continuous from an inlet portion of the conductor disposed in the inlet transition portion, to an outlet portion of the conductor disposed in the outlet transition portion. The conductor can receive and transmit electromagnetic signals from and to the antenna and a formation surrounding a borehole. The intermediate transition portions can be disposed in a transition zone of the exterior surface of the body, and where the transition zone extends from the first end to the second end of each of the circumferential portions.

One general aspect includes a method of manufacturing a coil antenna that can include forming a continuous groove in an exterior surface of a cylindrical body with the continuous groove including multiple circumferential portions, with each circumferential portion having a first end and a second end, the entire length of the portions being between the first and second ends and disposed within a plane, with each plane being parallel to one or more adjacent planes, and multiple intermediate transition portions, with each of the intermediate transition portions coupling a first end of one circumferential portion to a second end of an adjacent circumferential portion, and installing a conductor in the continuous groove thereby forming the coil antenna.

Implementations may include one or more of the following features. The continuous groove further include an inlet transition portion and an outlet transition portion, with the method further including installing an inlet portion of the conductor in the inlet transition portion and installing an outlet portion of the conductor in the outlet transition portion. Selectively transmitting an electromagnetic signal from the coil antenna and/or receiving an electromagnetic signal via the coil antenna. Defining a transition zone by forming a longitudinal recess along a portion of the exterior surface of the body, and grouping the multiple intermediate transition portions of the continuous groove in the transition zone. The longitudinal recess can be recessed radially inwardly relative to a portion of the exterior surface of the body.

One general aspect includes a system for measuring parameters of an earthen formation surrounding a borehole that can include an antenna assembly positioned in a borehole on a conveyance, the antenna assembly comprising a coil antenna with a continuous conductor installed in a continuous groove on an exterior surface of a housing (or body). The continuous groove can include first and second circumferential portions each having a first end and a second end, the entire length of the portions being between the first and second ends and, with the first circumferential portion disposed within a first plane and the second circumferential portion disposed within a second plane, with the first and second planes being parallel to each other, an inlet transition portion coupled to the first end of the first circumferential portion, an intermediate transition portion coupled between the second end of the first circumferential portion and the first end of the second circumferential portion and an outlet transition portion coupled to the second end of the second circumferential portion. The antenna assembly can radiate the earthen formation with electromagnetic signals and/or receive electromagnetic signals from the earthen formation, where parameters of the earthen formation can be determined based on the received electromagnetic signals. The housing can further include a longitudinal groove that is radially inwardly recessed, with the intermediate transition portion positioned in the longitudinal groove. The longitudinal groove can form a transition zone in the exterior surface of the housing, and the transition zone can be in a range from 5% to 95% of the circumference of the housing.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

The invention claimed is:

1. A downhole tool comprising:
   a body;
   an individual continuous groove in an exterior surface of the body; the individual continuous groove comprising:
      multiple circumferential portions recessed radially inwardly from the exterior surface of the body, with each circumferential portion having a first end and a second end, the entire length of the portions being between the first and second ends and disposed within a plane, with each plane being parallel to one or more adjacent planes; and
      multiple intermediate transition portions, with each of the intermediate transition portions recessed radially inwardly from the exterior surface of the body for an entire length of the intermediate transition portions from the first end of one circumferential portion to a second end of an adjacent circumferential portion; and
   a continuous conductor installed in the individual continuous groove such that the continuous conductor transitions between adjacent circumferential portions of the individual continuous groove in the intermediate transition portions of the individual continuous groove.

2. The downhole tool of claim 1, wherein the body is cylindrically shaped having a central longitudinal axis, and wherein the intermediate transition portions are grouped together in a transition zone of the exterior surface in the body.

3. The downhole tool of claim 2, wherein each of the planes are angled relative to the central axis by an angle in a range of 10 degrees to 90 degrees.

4. The downhole tool of claim 2, wherein the transition zone is in a range from 5% to 95% of a circumference of the body.

5. The downhole tool of claim 2, wherein the transition zone is in a range from 3% to 20% of a circumference of the body.

6. The downhole tool of claim 1, wherein the continuous groove further comprises:
   an inlet transition portion; and
   an outlet transition portion.

7. The downhole tool of claim 6, wherein a conductor is installed in the continuous groove forming an antenna with the conductor being continuous from an inlet portion of the conductor disposed in the inlet transition portion, to an outlet portion of the conductor disposed in the outlet transition portion.

8. The downhole tool of claim 7, wherein the conductor receives and transmits electromagnetic signals between the antenna and a formation surrounding a borehole.

9. The downhole tool of claim 1, wherein the intermediate transition portions are disposed in a transition zone of the exterior surface of the body, and wherein the transition zone extends from the first end to the second end of each of the circumferential portions.

10. The downhole tool of claim 1, wherein:
    each circumferential portion extends between 5% to 95% of a circumference of the body;
    the plane is spaced apart from one or more adjacent planes of adjacent circumferential portions of the continuous groove;
    the multiple intermediate transition portions extend between 5% to 95% of the circumference of the body; and wherein
    the continuous conductor extends through parallel adjacent circumferential portions of the continuous groove without another plane of the continuous groove or the continuous conductor disposed between the adjacent circumferential portions.

11. A method of manufacturing a coil antenna, the method comprising:
    forming a continuous groove in an exterior surface of a cylindrical body; the continuous groove comprising:
      multiple circumferential portions recessed radially inwardly from the exterior surface of the body, with each circumferential portion having a first end and a second end, the entire length of the portions being between the first and second ends and disposed within a plane, with each plane being parallel to one or more adjacent planes; and
      multiple intermediate transition portions, with each of the intermediate transition portions recessed radially inwardly from the exterior surface of the body for an entire length of the intermediate transition portions from the first end of one circumferential portion to a second end of an adjacent circumferential portion; and
    installing a conductor in the continuous groove such that the continuous conductor transitions between adjacent circumferential portions of the continuous groove in the intermediate transition portions of the continuous groove, thereby forming the coil antenna.

12. The method of claim 11, the continuous groove further comprising an inlet transition portion and an outlet transition portion, and the method further comprising installing an inlet portion of the conductor in the inlet transition portion and installing an outlet portion of the conductor in the outlet transition portion.

13. The method of claim 12, further comprising selectively transmitting an electromagnetic signal from the coil antenna and/or receiving an electromagnetic signal via the coil antenna.

14. The method of claim 11, the method further comprising defining a transition zone by forming a longitudinal recess along a portion of the exterior surface of the body, and grouping the multiple intermediate transition portions of the continuous groove in the transition zone.

15. The method of claim 14, wherein the longitudinal recess is recessed radially inwardly relative to a portion of the exterior surface of the body.

16. A system for measuring parameters of an earthen formation surrounding a borehole, the system comprising:
    an antenna assembly positioned in a borehole on a conveyance, the antenna assembly comprising a coil antenna with a continuous conductor installed in a continuous groove on an exterior surface of a housing, the continuous groove comprising:
      first and second circumferential portions recessed radially inwardly from the exterior surface of the housing, each of the first and second circumferential portions having a first end and a second end and the entire length of the portions being between the first and second ends, with the first circumferential portion disposed within a first plane and the second circumferential portion disposed within a second plane, and the first and second planes being parallel to each other;
      an inlet transition portion coupled to the first end of the first circumferential portion;
      an intermediate transition portion coupled between the second end of the first circumferential portion and the first end of the second circumferential portion the intermediate transition portion recessed radially inwardly from the exterior surface of the housing for an entire length of the intermediate transition portions between the second end of the first circumferential portion and the first end of the second circumferential portion; and
      an outlet transition portion coupled to the second end of the second circumferential portion; and
    the continuous conductor installed in the continuous groove such that the continuous conductor transitions between the first and second circumferential portions of the continuous groove in the intermediate transition portions of the continuous groove.

17. The system of claim 16, wherein the antenna assembly radiates the earthen formation with electromagnetic signals and/or receives electromagnetic signals from the earthen formation.

18. The system of claim 17, wherein parameters of the earthen formation are determined based on the received electromagnetic signals.

19. The system of claim 16, wherein the housing further comprises a longitudinal groove that is radially inwardly recessed, and wherein the intermediate transition portion is positioned in the longitudinal groove.

20. The system of claim 19, wherein the longitudinal groove forms a transition zone in the exterior surface of the housing, and wherein the transition zone is in a range from 5% to 95% of the circumference of the housing.

* * * * *